US012536939B2

(12) United States Patent
Kim et al.

(10) Patent No.: US 12,536,939 B2
(45) Date of Patent: Jan. 27, 2026

(54) DISPLAY DEVICE

(71) Applicant: LG Display Co., Ltd., Seoul (KR)

(72) Inventors: Injune Kim, Seoul (KR); Jae-Woong Youn, Gimpo-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/824,695

(22) Filed: Sep. 4, 2024

(65) Prior Publication Data

US 2025/0087127 A1 Mar. 13, 2025

(30) Foreign Application Priority Data

Sep. 8, 2023 (KR) ........................ 10-2023-0119752

(51) Int. Cl.
*G09G 3/20* (2006.01)
*G09G 3/3291* (2016.01)

(52) U.S. Cl.
CPC ......... *G09G 3/2003* (2013.01); *G09G 3/3291* (2013.01); *G09G 2300/043* (2013.01); *G09G 2300/0452* (2013.01); *G09G 2310/08* (2013.01)

(58) Field of Classification Search
CPC ..... G09G 2300/043; G09G 2300/0452; G09G 2310/08; G09G 3/2003; G09G 3/3233; G09G 3/3291
See application file for complete search history.

(56) References Cited

U.S. PATENT DOCUMENTS 9,305,494 B2 4/2016 Shim et al.
11,393,401 B2 7/2022 Choi et al.
11,881,166 B2 1/2024 Hong et al.
2014/0176409 A1* 6/2014 Kim .................... G09G 3/3233 345/92
2018/0020525 A1* 1/2018 Moon ........................ H01J 1/62
2019/0180688 A1* 6/2019 Yang .................... G09G 3/3258
2023/0134326 A1* 5/2023 Lee ...................... G09G 3/3233 345/690
2024/0257738 A1* 8/2024 Ha ...................... G09G 3/3233

FOREIGN PATENT DOCUMENTS

KR 10-2015-0077710 A 7/2015
KR 10-2021-0031582 A 3/2021
KR 10-2022-0050634 A 4/2022
KR 10-2022-0083396 A 6/2022
KR 10-2023-0064704 A 5/2023

* cited by examiner

*Primary Examiner* — Kenneth Bukowski

(74) *Attorney, Agent, or Firm* — Birch, Stewart, Kolasch & Birch, LLP

(57) ABSTRACT

A display device is provided, in which operation characteristics of an internal compensation pixel are applied to a degradation compensation modeling to achieve accurate degradation compensation. The display device can include a display panel including an internal compensation pixel, a data driver configured to apply a data voltage to the display panel, and a controller configured to compensate for image data based on a degradation compensation modeling. The degradation compensation modeling includes a degradation compensation modeling representing operation characteristics of the internal compensation pixel during a light-emission period, and a degradation compensation modeling representing operation characteristics of the internal compensation pixel during a sensing period. The compensated image data is provided to the data driver.

8 Claims, 7 Drawing Sheets

DISPLAY DEVICE

CROSS-REFERENCE TO RELATED APPLICATION

This application claims priority to Korean Patent Application No. 10-2023-0119752 filed on Sep. 8, 2023 in the Korean Intellectual Property Office, the entire contents of which is hereby expressly incorporated by reference into the present application.

BACKGROUND

Field

The present disclosure relates to a display device, and more specifically, to a display device in which operation characteristics of an internal compensation pixel are applied to a degradation compensation modeling to achieve accurate degradation compensation.

Discussion of the Related Art

Display devices used in computer monitors, TVs, mobile phones, etc. include organic light emitting display devices (OLED) that emit light on their own, and liquid crystal display devices (LCD) that require separate light sources.

A scope of the application of the display device is becoming more diverse, ranging from computer monitors and TVs to personal portable devices. Research is being conducted on a display device that has a large display area but a reduced volume and weight.

This display device can include a data driving circuit that supplies data signals to data lines of the display panel, and a gate driving circuit that supplies gate signals to gate lines of the display panel.

SUMMARY OF THE DISCLOSURE

A purpose of the present disclosure is to provide a display device in which operation characteristics of an internal compensation pixel are applied to a degradation compensation modeling to achieve accurate degradation compensation.

Furthermore, a purpose of the present disclosure is to provide a display device in which operation characteristics of the internal compensation pixel includes first operation characteristics corresponding to a light-emission period for emitting a light-emitting element and second operation characteristics corresponding to a sensing period for sensing a threshold voltage of the driving transistor and the first and second operation characteristics are separately applied to a degradation compensation modeling, thereby achieving accurate degradation compensation.

Purposes according to the present disclosure are not limited to the above-mentioned purpose. Other purposes and advantages according to the present disclosure that are not mentioned can be understood based on following descriptions, and can be more clearly understood based on embodiments according to the present disclosure. Further, it will be easily understood that the purposes and advantages according to the present disclosure can be realized using means shown in the claims or combinations thereof.

In order to achieve the above purpose, a display device according to one aspect of the present disclosure includes a display panel including a plurality of internal compensation pixels; and a data driver configured to apply a data voltage to the display panel; and a controller configured to compensate for image data based on a degradation compensation modeling, wherein the degradation compensation modeling includes a degradation compensation modeling representing operation characteristics of the internal compensation pixel during a light-emission period, and a degradation compensation modeling representing operation characteristics of the internal compensation pixel during a sensing period; and provide the compensated image data to the data driver.

In order to achieve the above purpose, a display device according to another aspect of the present disclosure includes a display panel including a plurality of internal compensation pixels, wherein each of the internal compensation pixels is configured to sense a threshold voltage of a driving transistor during a sensing period, and to emit light under a data voltage during a light-emission period, wherein the display device is configured to: apply operation characteristics of the internal compensation pixel during the light-emission period to a first compensation modeling; apply operation characteristics of the internal compensation pixel during the sensing period to a second compensation modeling; and compensate for image data based on the first compensation modeling and the second compensation modeling.

According to embodiment of the present disclosure, the operation characteristics of the internal compensation pixel can be applied to the degradation compensation modeling to achieve accurate degradation compensation.

Furthermore, according to embodiment of the present disclosure, the operation characteristics of the internal compensation pixel includes the first operation characteristics corresponding to the light-emission period for emitting a light-emitting element and the second operation characteristics corresponding to the sensing period for sensing the threshold voltage of the driving transistor, and the first and second operation characteristics can be separately applied to the degradation compensation modeling, thereby achieving accurate degradation compensation.

Effects of the present disclosure are not limited to the effects mentioned above, and other effects not mentioned will be clearly understood by those skilled in the art from the description below.

In addition to the above effects, specific effects of the present disclosure are described together while describing specific details for carrying out the present disclosure.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

DETAILED DESCRIPTION OF THE EMBODIMENTS

Figure 1:
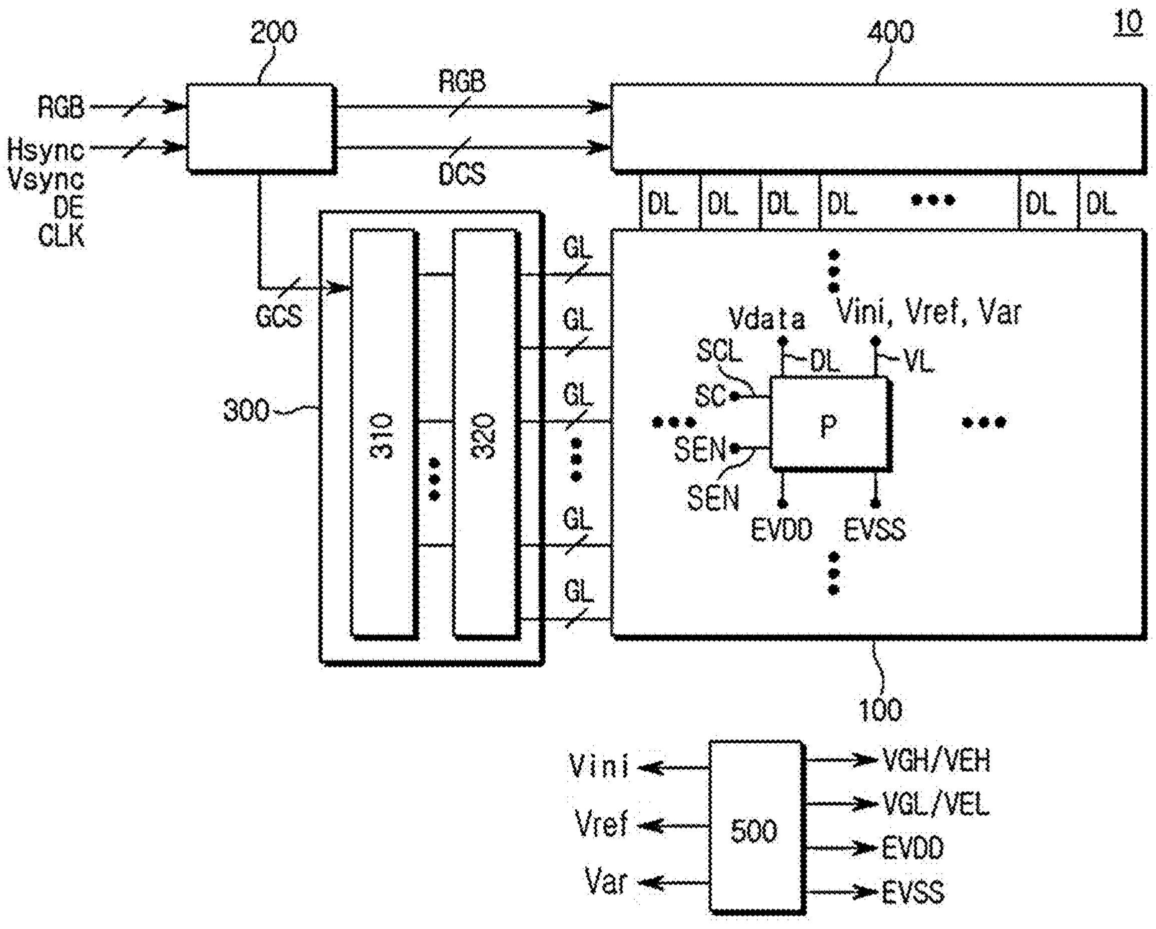
FIG. 1 is a block diagram schematically showing a display device according to an embodiment of the present disclosure.

Advantages and features of the present disclosure, and a method of achieving the advantages and features will become apparent with reference to embodiments described later in detail together with the accompanying drawings. However, the present disclosure is not limited to the embodiments as disclosed under, but can be implemented in various different forms. Thus, these embodiments are set forth only to make the present disclosure complete, and to completely inform the scope of the present disclosure to those of ordinary skill in the technical field to which the present disclosure belongs, and the present disclosure is only defined by the scope of the claims.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure can be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as can be included within the spirit and scope of the present disclosure as defined by the appended claims.

A shape, a size, a ratio, an angle, a number, etc. disclosed in the drawings for illustrating embodiments of the present disclosure are illustrative, and embodiments of the present disclosure are not limited thereto.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of associated listed items. Expression such as "at least one of" when preceding a list of elements can modify the entire list of elements and can not modify the individual elements of the list. In interpretation of numerical values, an error or tolerance therein can occur even when there is no explicit description thereof.

In addition, it will also be understood that when a first element or layer is referred to as being present "on", "above," "over,", etc. a second element or layer, the first element can be disposed directly on the second element or can be disposed indirectly on the second element with a third element or layer being disposed between the first and second elements or layers. It will be understood that when an element or layer is referred to as being "connected to", or "coupled to" another element or layer, it can be directly on, connected to, or coupled to the other element or layer, or one or more intervening elements or layers can be present. In addition, it will also be understood that when an element or layer is referred to as being "between" two elements or layers, it can be the only element or layer between the two elements or layers, or one or more intervening elements or layers can also be present.

Further, as used herein, when a layer, film, region, plate, or the like is disposed "on" or "on a top" of another layer, film, region, plate, or the like, the former can directly contact the latter or still another layer, film, region, plate, or the like can be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former can directly contact the latter or still another layer, film, region, plate, or the like can be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

In descriptions of temporal relationships, for example, temporal precedent relationships between two events such as "after", "subsequent to", "before", etc., another event can occur therebetween unless "directly after", "directly subsequent" or "directly before" is indicated.

When a certain embodiment can be implemented differently, a function or an operation specified in a specific block can occur in a different order from an order specified in a flowchart. For example, two blocks in succession can be actually performed substantially concurrently, or the two blocks can be performed in a reverse order depending on a function or operation involved.

It will be understood that, although the terms "first", "second", "third", and so on can be used herein to describe various elements, components, regions, layers and/or periods, these elements, components, regions, layers and/or periods should not be limited by these terms and may not define order or sequence. These terms are used to distinguish one element, component, region, layer or period from another element, component, region, layer or period. Thus, a first element, component, region, layer or period as described under could be termed a second element, component, region, layer or period, without departing from the spirit and scope of the present disclosure.

The features of the various embodiments of the present disclosure can be partially or entirely combined with each other, and can be technically associated with each other or operate with each other. The embodiments can be implemented independently of each other and can be implemented together in an association relationship.

In interpreting a numerical value, the value is interpreted as including an error range unless there is separate explicit description thereof.

It will be understood that when an element or layer is referred to as being “connected to”, or “coupled to” another element or layer, it can be directly on, connected to, or coupled to the other element or layer, or one or more intervening elements or layers can be present. In addition, it will also be understood that when an element or layer is referred to as being “between” two elements or layers, it can be the only element or layer between the two elements or layers, or one or more intervening elements or layers can also be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, “embodiments,” “examples,” “aspects”, and the like should not be construed such that any aspect or design as described is superior to or advantageous over other aspects or designs.

Further, the term ‘or’ means ‘inclusive or’ rather than ‘exclusive or’. That is, unless otherwise stated or clear from the context, the expression that ‘x uses a or b’ means any one of natural inclusive permutations.

The terms used in the description below have been selected as being general and universal in the related technical field. However, there can be other terms than the terms depending on the development and/or change of technology, convention, preference of technicians, etc. Therefore, the terms used in the description below should not be understood as limiting technical ideas, but should be understood as examples of the terms for illustrating embodiments.

Further, in a specific case, a term can be arbitrarily selected by the applicant, and in this case, the detailed meaning thereof will be described in a corresponding description period. Therefore, the terms used in the description below should be understood based on not simply the name of the terms, but the meaning of the terms and the contents throughout the Detailed Description section.

In description of flow of a signal, for example, when a signal is delivered from a node A to a node B, this can include a case where the signal is transferred from the node A to the node B via another node unless a phrase ‘immediately transferred’ or ‘directly transferred’ is used.

Further, the term “can” encompasses all the meanings and coverages of the term “may.” The term “disclosure” is interchangeably used with, or encompasses all the meanings and coverages of, the term “invention.”

All the components of each display device or apparatus according to all embodiments of the present disclosure are operatively coupled and configured.

Hereinafter, a display device according to some embodiments in which operation characteristics of an internal compensation pixel are applied to a degradation compensation modeling to achieve accurate degradation compensation will be described.

FIG. 1 is a block diagram schematically showing a display device according to an embodiment of the present disclosure.

Referring to FIG. 1, a display device 10 includes a display panel 100 including a plurality of pixels P, a controller 200, and a gate driver 300 that supplies a gate signal to each of the plurality of pixels P, a data driver 400 that supplies a data signal to each of the plurality of pixels P, and a power supply 500 that supplies power required for operation to each of the plurality of pixels P.

In the display panel 100, a plurality of gate lines GL and a plurality of data lines DL intersect each other, and each of the plurality of pixels P are connected to the gate line GL and the data line DL. Specifically, one pixel P receives the gate signal from the gate driver 300 via the gate line GL, and receives the data signal from the data driver 400 via the data line DL, and receives a high potential driving voltage EVDD and a low potential driving voltage EVSS from the power supply 500 via a power supply line.

The gate line GL supplies a scan signal SC and a light-emission control signal EM to the pixel and the data line DL supplies a data voltage Vdata to the pixel. Furthermore, according to various embodiments, the gate line GL can include a plurality of scan lines SCL that supply the scan signal SC and a light-emission control signal line EML that supplies the light-emission control signal EM. Furthermore, the plurality of pixels P can additionally include at least one power line VL and can receive an initialization voltage Vini, an anode reset voltage Var and a reference voltage Vref via the at least one power line VL.

Furthermore, each pixel P includes a light-emitting element and a pixel circuit that controls an operation of the light-emitting element. The pixel circuit includes a plurality of switching elements, a driving element, and a capacitor. In this regard, each of the switching element and the driving element can be embodied as a thin-film transistor. In the pixel circuit, the driving element controls an amount of current supplied to the light-emitting element based on the data voltage to adjust an amount of light emitted from the light-emitting element. Furthermore, the plurality of switching elements receives the scan signal SC supplied via the plurality of scan lines SCL and the light-emission control signal EM supplied via the light-emission control signal line EML and operates the pixel circuit based on the scan signal SC and the light-emission control signal EM.

The display panel 100 can be embodied as a non-transmissive display panel or a transmissive display panel. The transmissive display panel can be applied to a transparent display device where an image is displayed on a screen and a real object in a background is visible to a viewer in front of the display device. The display panel 100 can be manufactured as a flexible display panel. The flexible display panel can be embodied as an OLED panel using a plastic substrate.

The pixels P can include a red pixel, a green pixel, and a blue pixel to emit light of corresponding colors. The pixels P can further include a white pixel. Each of the pixels P includes a pixel circuit.

Touch sensors can be disposed on the display panel 100. Touch input can be sensed using separate touch sensors or can be sensed through the pixels P. The touch sensors can be disposed on the screen of the display panel in an on-cell type or add-on type or can be embodied as in-cell type touch sensors built into the display panel 100.

The controller 200 processes image data RGB input from an external source such as a host system so as to be adapted to a size and a resolution of the display panel 100 and supplies the processed image data to the data driver 400. The controller 200 generates a gate control signal GCS and a data control signal DCS based on synchronization signals, for example, a clock signal CLK, a data enable signal DE, a horizontal synchronization signal Hsync, and a vertical synchronization signal Vsync input from the external source, and supplies the generated gate control signal GCS and data control signal DCS to the gate driver 300 and the data driver 400, respectively, thereby controlling the gate driver 300 and the data driver 400.

The controller 200 can include a degradation compensation modeling to compensate for degradation of the display panel. The degradation compensation modeling can be stored in an internal memory or an external memory to the controller 200.

The controller 200 can compensate for image data RGB based on the degradation compensation modeling and can provide the compensated image data to the data driver 400. The data voltage applied to the pixel during light-emission, a temperature, and an initial threshold voltage distribution of the driving transistor can be applied to the degradation compensation modeling.

Specifically, the controller 200 can calculate compensation data for degradation compensation of the pixel based on a following Equation 1 of the degradation compensation modeling.

$$\Delta V_{th} = (t/\tau)^{\beta}$$
$$\tau = A \cdot V_{gs}^{-n} \cdot \exp\left(\frac{E_a}{R}\frac{1}{T}\right)$$
Equation 1 where t denotes an operation time of the display panel, t denotes a characteristic temporal scale of degradation, β denotes a stretch index, A denotes a process and element distribution coefficient, $V_{gs}$ denotes a gate-source voltage of the driving transistor based on the data voltage, n denotes an acceleration coefficient, $E_a$ represents activation energy, R denotes an ideal gas constant, and T denotes an absolute temperature.

The controller 200 can compensate for degradation of the driving transistor occurring depending on a magnitude of $V_{gs}$, for example, the data voltage applied to the pixel for light emission. The above Equation 1 can be applied to the degradation compensation modeling of an external compensation display device in which the degradation occurs in a light-emission period.

Furthermore, in an embodiment of the present disclosure, in order to compensate for the degradation of an internal compensation display device, operation characteristics of an internal compensation pixel can include first operation characteristics corresponding to a light-emission period and second operation characteristics corresponding to a sensing period. In other words, the operation characteristics of the internal compensation pixel can include the first operation characteristics during the light-emission period for emitting light of the light-emitting element and the second operation characteristics during the sensing period for sensing the threshold voltage of the driving transistor of the pixel in the pixel.

In the internal compensation pixel, a high level of peak current is applied to the driving transistor thereof during the sensing period depending on the operation characteristics. Accordingly, the driving transistor can be degraded during the sensing period.

According to embodiments of the present disclosure, the first operation characteristics during the light-emission period for emitting the light-emitting element and the second operation characteristics during the sensing period for sensing the threshold voltage of the driving transistor can be applied to the degradation compensation modeling to enable accurate degradation compensation of an internal compensation display panel.

The degradation compensation modeling can include a first compensation modeling representing the degradation characteristics of the driving transistor of the internal compensation pixel during the light-emission period, and a second compensation modeling representing the degradation characteristics of the driving transistor of the internal compensation pixel during the sensing period.

The first compensation modeling can be used to calculate compensation data to compensate for degradation characteristics during the light-emission period based on a following Equation 2.

$$\Delta V_{th\_d} = (t/\tau\_\mathrm{d})^{\beta\_d},$$
$$\tau\_\mathrm{d} = \mathrm{A\_d} \cdot V_{gs}^{-n} \cdot \exp\left(\frac{E_{a\_d}}{R}\frac{1}{T}\right),$$
Equation 2 where t denotes the operation time of the display panel, τ_d denotes a characteristic temporal scale of degradation during the light-emission period, β_d denotes a stretch index during the light-emission period, A_d denotes a process and element distribution coefficient during the light-emission period, $V_{gs}$ denotes a gate-source voltage of the driving transistor based on the data voltage, n denotes the acceleration coefficient, Ea_d denotes activation energy during the light-emission period, R denotes the ideal gas constant, and T denotes the absolute temperature.

The second compensation modeling can be used to calculate compensation data to compensate for the degradation characteristics during the sensing period based on a following Equation 3.

$$\Delta V_{th\_s} = (t/\tau\_\mathrm{s})^{\beta\_s},$$
$$\tau\_\mathrm{s} = \mathrm{A\_s} \cdot \exp\left(\frac{E_{a\_s}}{R}\frac{1}{T}\right),$$
Equation 3 where t denotes the operation time of the display panel, τ_s denotes a characteristic temporal scale of degradation during the sensing period, β_s denotes a stretch index during the sensing period, A_s denotes a process and element distribution coefficient during the sensing period, Ea_s denotes activation energy during the sensing period, R denotes the ideal gas constant, and T denotes an absolute temperature.

Since the sensing operation of the internal compensation circuit is performed under a global condition, the second compensation modeling unlike the first compensation modeling during the light-emission period can be created only based on the temperature and the initial threshold voltage of the driving transistor without the $V_{gs}$ acceleration factor.

The different β, A, and Ea factors can be based on different degradation characteristics of the light-emission period and the sensing period and thus can be separately applied to the first and second compensation modeling. That is, the β, A, and Ea factors during the light-emission period can be set to have different values from the β, A, and Ea factors during the sensing period.

As described above, the controller 200 can generate the compensation data based on the first compensation modeling representing the operation characteristics during the light-emission period of the internal compensation pixel and the second compensation modeling representing the operation characteristics during the sensing period thereof, and can compensate for the image data using the generated compensation data.

The controller 200 can be configured to be coupled to various processors, for example, a microprocessor, a mobile processor, an application processor, etc., depending on a type of a device on which the controller is mounted.

The host system can be any one of a television (TV) system, a set top box, a navigation system, a personal computer (PC), a home theater system, a mobile device, a wearable device, and a vehicle system.

The controller 200 generates, based on the timing signals Vsync, Hsync, and DE received from the host system, the gate control signal GCS for controlling the operation timing of the gate driver 300, and the data control signal DCS for controlling the operation timing of the data driver 400. The controller 200 controls the operation timings of the gate driver 300 and the data driver 400 to synchronize the gate driver 300 and the data driver 400 with each other.

A level shifter converts a voltage level of the gate control signal GCS output from the controller 200 into a gate on voltage VGL and VEL and a gate off voltage VGH and VEH which in turn are supplied to the gate driver 300. The level shifter converts a low level voltage of the gate control signal GCS to a gate low voltage VGL, and converts a high level voltage of the gate control signal GCS to a gate high voltage VGH. The gate control signal GCS includes a start pulse and a shift clock.

The gate driver 300 supplies the scan signal SC to the gate line GL according to the gate control signal GCS supplied from the controller 200. The gate driver 300 can be disposed at one side or each of both opposing sides of the display panel 100 and in a GIP (Gate In Panel) manner.

The gate driver 300 sequentially outputs the gate signal to the plurality of gate lines GL under control of the controller 200. The gate driver 300 can shift the gate signal using a shift register and sequentially supply the shifted gate signal to the gate lines GL.

The gate signal can include the scan signal SC and the light-emission control signal EM in an organic light-emitting display device. The scan signal SC includes a scan pulse swinging between the gate on voltage VGL and the gate off voltage VGH. The light-emission control signal can include a light-emission control signal pulse that swings between the gate on voltage VEL and the gate off voltage VEH.

The scan pulse is synchronized with the data voltage Vdata to select pixels of a line to which data is to be written. The light-emission control signal EM selects pixels of a line from which the driving current is to be sensed.

The gate driver 300 can include a light-emission control signal driver 310 and at least one scan driver 320. The light-emission control signal driver 310 outputs the light-emission control signal pulse in response to the start pulse and the shift clock received from the controller 200 and sequentially shifts the light-emission control signal pulse according to the shift clock. Each of the at least one scan driver 320 outputs the scan pulse in response to the start pulse and the shift clock received from the controller 200, and shifts the scan pulse according to a shift clock timing.

The data driver 400 converts the image data RGB into the data voltage Vdata according to the data control signal DCS supplied from the controller 200, and supplies the converted data voltage Vdata to the pixel P via the data line DL.

In FIG. 1, one data driver 400 is disposed at one side of the display panel 100. However, the number and a position of the data drivers 200 are not limited thereto. That is, the data driver 400 can be embodied as a plurality of integrated circuits (ICs) which can be disposed at one side of the display panel 100 and can be separately arranged along the one side.

The power supply 500 generates direct current (DC) power necessary for operating a pixel array of the display panel 100 and the display panel driver using a DC-DC converter. The DC-DC converter can include a charge pump, a regulator, a buck converter, a boost converter, etc. The power supply 500 receives a DC input voltage applied from the host system and generates DC voltages such as the gate on voltage VGL and VEL, the gate off voltage VGH and VEH, the high-potential driving voltage EVDD, the low-potential driving voltage EVSS, etc. The gate on voltage VGL and VEL and the gate off voltage VGH and VEH are supplied to the level shifter and the gate driver 300. Each of the high-potential driving voltage EVDD and the low-potential driving voltage EVSS is commonly supplied to the pixels.

Furthermore, the power supply 500 can generate direct current voltages such as the initialization voltage Vini, the anode reset voltage Var and the reference voltage Vref. The initialization voltage Vini, the reference voltage Vref, and the anode reset voltage Var are supplied to the pixel P via the at least one power line VL. In this regard, the at least one power line VL can include a reference voltage bus line VrefL, an anode reset voltage bus line VarL, and an initialization voltage bus line ViniL. In one example, the reference voltage bus line VrefL, the anode reset voltage bus line VarL, and the initialization voltage bus line ViniL can be disposed between the gate driver 300 and the display area AA. However, embodiments of the present disclosure are not limited thereto.

Figure 2:
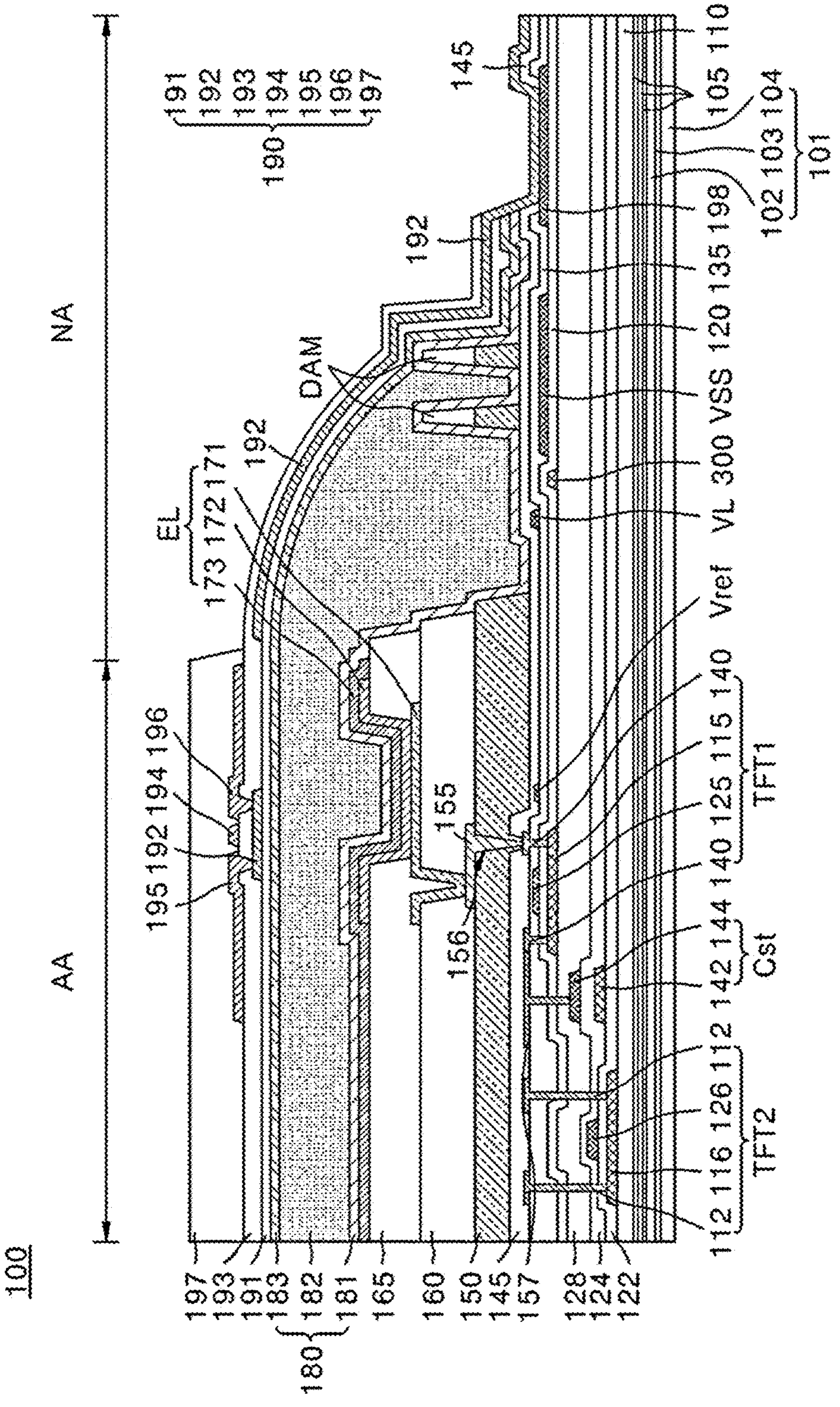
FIG. 2 is a cross-sectional view showing a stack structure of a display device according to an embodiment of the present disclosure.

FIG. 2 is a cross-sectional view showing a stack structure of a display device according to an embodiment of the present disclosure.

Referring to FIG. 2, the display panel 100 includes a display area (or active area) AA where the pixel P is located, and a non-display area (or non-active area) NA surrounding the display area AA. The gate driver 300 and the data driver 400 are disposed in the non-display area NA. The non-display area NA can surround the display area AA entirely or in part.

The display panel 100 according to an embodiment of the present disclosure includes a substrate 101, a thin-film transistor TFT1 and TFT2, a bank layer 165, a light-emitting element EL, an encapsulation layer 180, a touch layer 190, a touch protective film 197, a dam DAM, and a pad 198.

The thin-film transistor TFT1 can be disposed on the substrate 101. The thin-film transistor TFT1 drives the light-emitting element EL of the display area AA.

The substrate 101 supports various components of the display panel 100. The substrate 101 can be made of a transparent insulating material, such as glass or plastic. When the substrate 101 is made of plastic, the substrate can be referred to as a plastic film or plastic substrate. For example, the substrate 101 can be in a form of a film including one of polyimide-based polymer, polyester-based polymer, silicone-based polymer, acryl-based polymer, polyolefin-based polymer, and copolymer thereof. However, embodiments of the present disclosure are not limited thereto.

The thin-film transistor TFT1 can include a semiconductor layer 115, a gate electrode 125, and source and drain electrodes 140. The thin-film transistor TFT1 is a driving transistor (e.g., DT in FIG. 4). The semiconductor layer 115 can be made of polysilicon (p-Si). In this case, a predetermined area thereof can be doped with impurities. Furthermore, the semiconductor layer 115 can be made of amorphous silicon a-Si or various organic semiconductor materials such as pentacene. The semiconductor layer 115 can be made of oxide. Embodiments of the present disclosure are not limited to the material constituting the semiconductor layer 115. The semiconductor layer 115 can be an active layer. However, embodiments of the present disclosure are not limited thereto.

The gate electrode 125 can be disposed on top of the semiconductor layer 115. The gate electrode 125 can be made of a variety of conductive materials, such as magnesium (Mg), aluminum (Al), nickel (Ni), chromium (Cr), molybdenum (Mo), tungsten (W), gold (Au) or an alloy thereof, etc. However, embodiments of the present disclosure are not limited thereto.

A gate insulating layer can be disposed between the semiconductor layer 115 and the gate electrode 125. The gate insulating layer can be a layer to insulate the semiconductor layer 115 and the gate electrode 125 from each other, and can be made of an insulating material. For example, the gate insulating layer can be composed of a single or double layer made of silicon oxide (SiOx) or silicon nitride (SiNx). However, embodiments of the present disclosure are not limited thereto.

The source and drain electrodes 140 can be electrically connected to the semiconductor layer 115 and spaced apart from each other. The source and drain electrodes 140 can be disposed on the insulating layer. Each of the source and drain electrodes 140 can be made of a conductive material, for example, copper (Cu), aluminum (Al), molybdenum (Mo), titanium (Ti) or an alloy thereof, etc. However, embodiments of the present disclosure are not limited thereto.

The capacitor Cst can be disposed on the substrate 101. The capacitor Cst can include a first gate electrode 142 and a second gate electrode 144. The gate insulating layer 124 can be disposed between the first gate electrode 142 and the second gate electrode 144. At least one of the first gate electrode 142 and the second gate electrode 144 can be connected to the electrode of the thin-film transistor TFT1. The capacitor Cst can be connected to the thin-film transistor TFT1 via a connection electrode 157.

Another thin-film transistor TFT2 can be disposed on the substrate 101. The thin-film transistor TFT2 can include a semiconductor layer 116, a gate electrode 126, and source and drain electrodes 112. The thin-film transistor TFT2 can be one of first to third transistors T1 to T3 (e.g., see FIG. 4). A gate insulating layer 122 can be disposed between the semiconductor layer 116 and the gate electrode 126.

An interlayer insulating layer 128 can be disposed between the thin-film transistor TFT2 and the capacitor Cst, or between the thin-film transistor TFT1 and another thin-film transistor TFT2.

For convenience of illustration, among the various thin-film transistors that can be included in the display device 10, only two thin-film transistors, that is, the thin-film transistor TFT1 corresponding to the driving transistor (DT in FIG. 4) and the thin-film transistor TFT2 corresponding to one of the first to sixth transistors T1 to T6 (in FIG. 4) are shown. However, other thin-film transistors corresponding to the remaining transistors of the first to sixth transistors T1 to T6 (in FIG. 4) can be included in the display panel 100. Further, an example in which the thin-film transistor has a coplanar structure is described. However, the thin-film transistor can be implemented to have other structures such as a staggered structure. The present disclosure is not limited thereto.

The thin-film transistor TFT1 can receive the high-potential driving voltage EVDD in response to the data voltage Vdata supplied to the gate electrode 125 of the thin-film transistor TFT1 to control the current amount supplied to the light-emitting element EL to adjust an amount of light emitted from the light-emitting element EL. The thin-film transistor TFT1 can supply a constant current based on a voltage charged in the capacitor Cst to maintain light emission of the light-emitting element EL until the data voltage Vdata of a next frame is supplied thereto. The high-potential supply line can extend in a parallel manner to the data line.

The thin-film transistor TFT includes the semiconductor layer 115 disposed on the interlayer insulating layer 128, the gate electrode 125 overlapping the semiconductor layer 115 while a second insulating layer 120 is interposed therebetween, and the source and drain electrodes 140 formed on a third insulating layer 135 and contacting the semiconductor layer 115.

The semiconductor layer 115 can act as an area where a channel is formed during an operation of the thin-film transistor TFT1. The semiconductor layer 115 can be made of an oxide semiconductor, or can be made of various organic semiconductors such as amorphous silicon (a-Si), polycrystalline silicon (poly-Si), or pentacene. The present disclosure is not limited thereto. The semiconductor layer 115 can be formed on the interlayer insulating layer 128. The semiconductor layer 115 can include a channel area, a source area, and a drain area. The channel area can overlap with the gate electrode 125 while the second insulating layer 120 is interposed therebetween. The channel area can be generated between the source and drain electrodes 140. The source area can be electrically connected to the source electrode 140 via a contact hole extending through the second insulating layer 120 and the third insulating layer 135. The drain area can be electrically connected to the drain electrode 140 via a contact hole extending through the second insulating layer 120 and the third insulating layer 135.

A buffer layer 105 and a first insulating layer 110 can be disposed between a semiconductor layer 116 and the substrate 101. The buffer layer 105 can delay diffusion of moisture and/or oxygen invading into the substrate 101. The first insulating layer 110 can protect the semiconductor layer 115 and can block various types of defects introduced from the substrate 101.

The uppermost layer of the buffer layer 105 in contact with the first insulating layer 110 can be made of a material having different etching characteristics from those of each of the remaining layers of the buffer layer 105, the first insulating layer 110, the second insulating layer 120 and the third insulating layer 135. The uppermost layer of the buffer layer 105 contacting the first insulating layer 110 can be made of one of silicon nitride (SiNx) and silicon oxide (SiOx). Each of the remaining layers of the buffer layer 105, the first insulating layer 110, the second insulating layer 120, and the third insulating layer 135 can be made of the other of silicon nitride (SiNx) and silicon oxide (SiOx). For example, the uppermost layer of the buffer layer 105 in contact with the first insulating layer 110 can be made of silicon nitride (SiNx), while each of the remaining layers of the buffer layer 105, the first insulating layer 110, the second insulating layer 120, and the third insulating layer 135 can be made of silicon oxide (SiOx). The present disclosure is not limited thereto.

The gate electrode 125 can be formed on the second insulating layer 120 and can overlap the channel area of the semiconductor layer 115 while the second insulating layer 120 is interposed therebetween. The gate electrode 125 can be made of a first conductive material and can be embodied as a single layer or multi-layers made of magnesium (Mg), molybdenum (Mo), aluminum (Al), chromium (Cr), gold (Au), titanium (Ti), nickel (Ni), neodymium (Nd), copper (Cu), or an alloy thereof. The present disclosure is not limited thereto.

The source electrode 140 can be connected to the exposed source area of the semiconductor layer 115 via the contact hole extending through the second insulating layer 120 and the third insulating layer 135. The drain electrode 140 can be opposite to the source electrode 140 and can be connected to the drain area of the semiconductor layer 115 via the contact hole extending through the second insulating layer 120 and the third insulating layer 135. Each of the source and drain electrodes 140 can be made of a second conductive material and can be embodied as a single layer or multi-layers made of molybdenum (Mo), aluminum (Al), chromium (Cr), gold (Au), titanium (Ti), nickel (Ni), neodymium (Nd), copper (Cu), or an alloy thereof. The present disclosure is not limited thereto.

A connection electrode 155 can be disposed between a first middle layer 150 and a second middle layer 160. The connection electrode 155 can be connected to the drain electrode 140 via a connection electrode contact hole 156 extending through a protective film 145 and the first middle layer 150. The connection electrode 155 can be made of a material having low resistivity and identical to or similar to that of the drain electrode 140. The present disclosure is not limited thereto.

A reference voltage line VrefL can be a sub-power line branched from the reference voltage bus line of the power line VL, and can be disposed in the same layer as a layer of the source and drain electrodes 140 of the thin-film transistor TFT1. Embodiments of the present disclosure are not limited thereto, and the reference voltage line VrefL can be disposed on the interlayer insulating layer 128 or the second insulating layer 120.

The light-emitting element EL including a light-emitting layer 172 can be disposed on a second middle layer 160 and a bank layer 165. The light-emitting element 170 can include an anode electrode 171, at least one light-emitting layer 172 formed on the anode electrode 171, and a cathode electrode 173 formed on the light-emitting layer 172.

The anode electrode 171 can be electrically connected to an exposed portion of the connection electrode 155 disposed on the first middle layer 150 and facing the second middle layer 160 via a contact hole extending through the second middle layer 160.

The anode electrode 171 of each pixel is not covered with the bank layer 165. The bank layer 165 can be made of an opaque material (e.g., black) to prevent light interference between adjacent pixels. In this case, the bank layer 165 can include a light-shielding material including at least one of color pigment, organic black, and carbon black. The present disclosure is not limited thereto.

The at least one light-emitting layer 172 can be formed on a portion of the anode electrode 171 corresponding to a light-emitting area defined by the bank layer 165. The at least one light-emitting layer 172 can include a hole transport layer, a hole injection layer, a hole blocking layer, a light-emitting layer 172, an electron injection layer, an electron blocking layer, and an electron transport layer on the anode electrode 171. A stacking order of the hole transport layer, the hole injection layer, the hole blocking layer, the light-emitting layer 172, the electron injection layer, the electron blocking layer, and the electron transport layer can be based on a light-emitting direction. In addition, the light-emitting layer 172 can include first and second light-emitting stacks facing each other while a charge generating layer is interposed therebetween. In this case, the light-emitting layer 172 of one of the first and second light-emitting stacks can generate blue light, while the light-emitting layer 172 of the other of the first and second light-emitting stacks can generate yellow-green light, so that white light can be generated from a combination of the first and second light-emitting stacks. The white light generated from the combination of the first and second light-emitting stacks can be incident on a color filter positioned above or below the light-emitting layer 172, such that a color image can be realized. In another example, each light-emitting layer 172 can generate each color light corresponding to each pixel without a separate color filter such that a color image can be rendered. For example, the light-emitting layer 172 of a red (R) pixel emits red light, the light-emitting layer 172 of a green (G) pixel emits green light, and the light-emitting layer 172 of a blue (B) pixel emits blue light.

The cathode electrode 173 can be formed to face the anode electrode 171 while the light-emitting layer 172 is disposed therebetween, and can receive the high-potential driving voltage EVDD.

An encapsulation layer 180 can block penetration of external moisture or oxygen into the light-emitting element EL that is vulnerable to external moisture or oxygen. To this end, the encapsulation layer 180 can include at least one inorganic encapsulation layer and at least one organic encapsulation layer. The present disclosure is not limited thereto. In the present disclosure, a structure of the encapsulation layer 180 in which a first encapsulation layer 181, a second encapsulation layer 182, and a third encapsulation layer 183 are sequentially stacked is described by way of example.

The first encapsulation layer 181 is formed on the substrate 101 on which the cathode electrode 173 has been formed. The third encapsulation layer 183 is formed on the substrate 101 on which the second encapsulation layer 182 has been formed. The third encapsulation layer 183 and the first encapsulation layer 181 can surround a top face, a bottom face and a side face of the second encapsulation layer 182. The first encapsulation layer 181 and the third encapsulation layer 183 can minimize or prevent penetration of external moisture or oxygen into the light-emitting element EL. Each of the first encapsulation layer 181 and the third encapsulation layer 183 can be made of an inorganic insulating material that can be deposited at a low temperature, such as silicon nitride (SiNx), silicon oxide (SiOx), silicon oxynitride (SiON), or aluminum oxide ($Al_2O_3$). Each of the first encapsulation layer 181 and the third encapsulation layer 183 is deposited in a low temperature atmosphere. Thus, during a deposition process of the first encapsulation layer 181 and the third encapsulation layer 183, the light-emitting element EL which is vulnerable to a high-temperature atmosphere can be prevented from being damaged.

The second encapsulation layer 182 serves as a shock-absorbing layer to relieve a stress between layers due to bending of the display device 10, and can planarize a step between layers. The second encapsulation layer 182 can be made of a non-photosensitive organic insulating material such as acryl resin, epoxy resin, phenolic resin, polyamide resin, polyimide resin, polyethylene or silicon oxycarbon (SiOC) or a photosensitive organic insulating material such as photoacryl. The present disclosure is not limited thereto. When the second encapsulation layer 182 is formed using an inkjet method, a dam DAM can be disposed to prevent the second encapsulation layer 182 in a liquid state from spreading to an edge of the substrate 101. The dam DAM can be closer to the edge of the substrate 101 than the second encapsulation layer 182 can be. The dam DAM can prevent the second encapsulation layer 182 in the liquid state from spreading to a pad area where a conductive pad disposed at the outermost side of the substrate 101 is disposed.

The dam DAM is designed to prevent diffusion of the second encapsulation layer 182. However, when the second encapsulation layer 182 overflows the dam DAM during a process, the second encapsulation layer 182 as an organic layer can be exposed to an outside, so that moisture or the like can invade the light-emitting element. Therefore, to prevent the invasion, at least ten dams DAM can be stacked.

The dam DAM can be disposed on the interlayer insulating layer disposed on the third insulating layer 135 and in the non-display area NA. However, embodiments of the present disclosure are not limited thereto, and the interlayer insulating layer can be the third insulating layer 135.

Further, the dam DAM, and the first middle layer 150 and the second middle layer 160 can be formed simultaneously. The first middle layer 150, and a lower layer of the dam DAM can be formed simultaneously. The second middle layer 160, and an upper layer of the dam DAM can be formed simultaneously. Thus, the dam DAM can have a double layer structure.

Accordingly, the dam DAM can be made of the same material as that of each of the first middle layer 150 and the second middle layer 160. However, embodiments of the present disclosure are not limited thereto.

The dam DAM can overlap the low-potential driving power line VSS. For example, the low-potential driving power line VSS can be formed in a layer under the dam DAM and in the non-display area NA.

The low-potential driving power line VSS and a gate driver 300 in a form of a gate in panel (GIP) can surround a periphery of the display panel. The low-potential driving power line VSS can be located outwardly of the gate driver 300. Further, the low-potential driving power line VSS can be connected to the anode electrode 171 to apply a common voltage thereto. The gate driver 300 is simply illustrated in plan and cross-sectional views. However, the gate driver 300 can be configured using a thin-film transistor TFT having the same structure as that of the thin-film transistor TFT of the display area AA.

The low-potential driving power line VSS is disposed outwardly of the gate driver 300. The low-potential driving power line VSS is disposed outwardly of the gate driver 300 and surrounds the display area AA. The low-potential driving power line VSS can be made of the same material as that of each of the source and drain electrodes 140 of the thin-film transistor TFT. The present disclosure is not limited thereto. For example, the low-potential driving power line VSS can be made of the same material as that of the gate electrode 125.

Further, the low-potential driving power line VSS can be electrically connected to the anode electrode 171. The low-potential driving power line VSS can supply the low-potential driving voltage EVSS to the plurality of pixels in the display area AA.

The low-potential driving power line VSS can be disposed on the third insulating layer 135. Alternatively, the low-potential driving power line VSS can be disposed on a layer of the source and drain electrodes 140 or the gate electrode 125 of the thin-film transistor TFT1. However, embodiments of the present disclosure are not limited thereto.

The at least one power line VL can be disposed between the gate driver 300 and the display area AA. The at least one power line VL can be disposed in the same layer as a layer of the source and drain electrodes 140 of the thin-film transistor TFT. However, embodiments of the present disclosure are not limited thereto. The at least one power line VL is shown in a simple manner in the cross-sectional view. However, the reference voltage bus line VrefL, the anode reset voltage bus line VarL, and the initialization voltage bus line ViniL constituting the at least one power line VL can be arranged side by side and can be disposed in the same layer. Alternatively, the reference voltage bus line VrefL, the anode reset voltage bus line VarL, and the initialization voltage bus line ViniL can be disposed in different layers in an overlapping or non-overlapping manner. The initialization voltage bus line can supply the initialization voltage Vini to the plurality of pixels in the display area AA. The anode reset voltage bus line VarL can supply the anode reset voltage Var to the plurality of pixels in the display area AA. The reference voltage bus line VrefL can supply the reference voltage Vref to the plurality of pixels in the display area AA. The at least one power line VL is illustrated as being positioned between the gate driver 300 and the display area AA. However, embodiments of the present disclosure are not limited thereto.

A touch layer 190 can be disposed on the encapsulation layer 180. In the touch layer 190, a touch buffer film 191 can be positioned between a touch sensor metal including touch electrode connection lines 192 and 194 and touch electrodes 195 and 196 and the cathode electrode 173 of the light-emitting element EL.

The touch buffer film 191 can prevent chemical (developer, etchant, etc.) used in a manufacturing process of the touch sensor metal disposed on the touch buffer film 191 or moisture from the outside from invading the light-emitting layer 172 including an organic material. Accordingly, the touch buffer layer 191 can prevent damage to the light-emitting layer 172 as vulnerable to the chemicals or moisture.

The touch buffer film 191 can be made of an organic insulating material that can be formed at a low temperature below or equal to a certain temperature (100 degrees Celsius) to prevent damage to the light-emitting layer 172 including the organic material vulnerable to a high temperature, and that has a low dielectric constant of 1 to 3. For example, the touch buffer layer 191 can be made of an acryl-based, epoxy-based, or siloxane-based material. The touch buffer film 191 made of the organic insulating material and having planarization performance can prevent damage to the encapsulation layer 180 and fracture of the touch sensor metal formed on the touch buffer film 191 due to bending of the organic light-emitting display device.

According to a mutual-capacitance-based touch sensor structure, the touch electrodes 195 and 196 can be disposed on the touch buffer layer 191, and the touch electrodes 195 and 196 can be disposed to intersect each other.

The touch electrode connection lines 192 and 194 can electrically connect the touch electrodes 195 and 196 to each other. The touch electrode connection lines 192 and 194 and the touch electrodes 195 and 196 can be positioned on different layers while the touch insulating film 193 is interposed therebetween.

The touch electrode connection lines 192 and 194 can overlap the bank layer 165, thereby preventing an aperture ratio from being lowered.

In one example, a portion of the touch electrode connection line 192 can extend along upper and side surfaces of the encapsulation layer 180 and upper and side surfaces of the dam DAM and then can be electrically connected to a touch driver circuit via a pad 198. Thus, the touch electrodes 195 and 196 can be electrically connected to the touch driver circuit.

The portion of the touch electrode connection line 192 can receive a touch driving signal from the touch driver circuit and transmit the same to the touch electrodes 195 and 196, and can receive a touch sensing signal from the touch electrodes 195 and 196 and can transmit the same to the touch driver circuit.

A touch protective film 197 can be disposed on the touch electrodes 195 and 196. In the drawing, it is shown that the touch protective film 197 is disposed only on the touch electrodes 195 and 196. However, embodiments of the present disclosure are not limited thereto. The touch protective film 197 can extend to an inner end or an outer end of the dam DAM and thus can also be disposed on the touch electrode connection line 192.

Further, a color filter can be further disposed on the encapsulation layer 180, and the color filter can be positioned on the touch layer 190 or between the encapsulation layer 180 and the touch layer 190.

Figure 3:
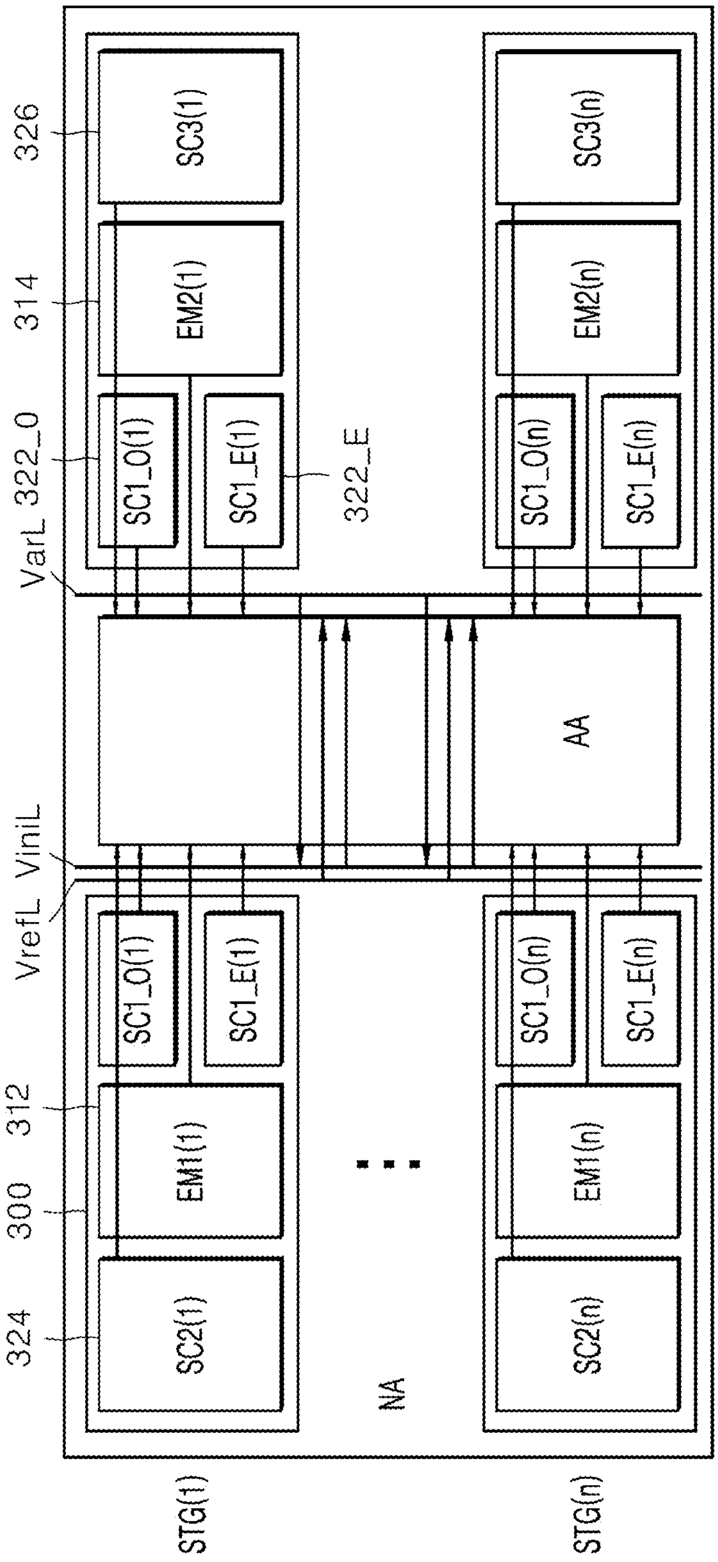
FIG. 3 is a diagram of a configuration of a gate driver in a display device according to an embodiment of the present disclosure.

FIG. 3 is a diagram of a configuration of a gate driver in a display device according to an embodiment of the present disclosure.

Referring to FIG. 3, the gate driver 300 includes a first light-emission control signal driver 312 and a second light-emission control signal driver 314. Furthermore, the gate driver 300 further includes first scan drivers 322_O and 322_E, a second scan driver 324, and a third scan driver 326. The first scan drivers 322_O and 322_E can be composed of the odd-numbered scan drivers 322_O and the even-numbered scan drivers 322_E.

The gate driver 300 can include shift registers which can be respectively disposed on both opposing sides of the display area AA symmetrically. Further, in the gate driver 300, the shift register on one side of the display area AA can be configured to include the first scan drivers 322_O and 322_E, the first light-emission control signal driver 312, and the second scan driver 324. The shift register on the other side of the display area AA can be configured to include the first scan drivers 322_O and 322_E, the second light-emission control signal driver 314, and the third scan driver 326. However, embodiments of the present disclosure are not limited thereto, and the first light-emission control signal driver 312, the second light-emission control signal driver 314, the first scan drivers 322_0, 322_E, the second scan driver 324, and the third scan driver 326 can be arranged in a manner varying according to embodiments of the present disclosure.

Each of stages STG(1) to STG(n) of the shift register can include each of first scan signal generators SC1_O(1) to SC1_O(n), and SC1_E(1) to SC1_E(n)), each of first light-emission control signal generators EM1(1) to EM1(*n*), each of second light-emission control signal generators (EM2(1) to EM2(*n*)), each of second scan signal generators SC2(1) to SC2(*n*), and each of third scan signal generators SC3(1) to SC3(*n*). Here, n is a real number such as a positive integer.

The first scan signal SC1(*n*) can be used as a signal to drive the first transistor T1 (see FIG. 4) included in the pixel circuit. The second scan signal SC2(*n*) can be used as a signal to drive the second transistor T2 (see FIG. 4) included in the pixel circuit. The third scan signal SC3(*n*) can be used as a signal to drive the fifth transistor T5 (see FIG. 4) and the sixth transistor T6 (see FIG. 4) included in the pixel circuit. The first light-emission control signal EM1(*n*) can be used as a signal to drive the third transistor T3 (see FIG. 4) included in the pixel circuit. The second light-emission control signal EM2(*n*) can be used as a signal to drive the fourth transistor T4 (see FIG. 4) included in the pixel circuit.

Referring to FIG. 3, the reference voltage bus line VrefL, the anode reset voltage bus line VarL, and the initialization voltage bus line ViniL can be disposed between and connected to the gate driver 300 and the display area AA.

The reference voltage bus line VrefL, the anode reset voltage bus line VarL, and the initialization voltage bus line ViniL can respectively supply the reference voltage Vref, the anode reset voltage Var, and the initialization voltage Vini from the power supply 500 to the pixel circuit.

As an example, it is shown that each of the reference voltage bus line VrefL, the anode reset voltage bus line VarL, and the initialization voltage bus line ViniL is disposed on only one of a left or right side of the display area AA. However, embodiments of the present disclosure are not limited thereto. The reference voltage bus lines VrefL can be respectively disposed on both opposing sides of the display area AA. The anode reset voltage bus lines VarL can be respectively disposed on both opposing sides of the display area AA. The initialization voltage bus lines ViniL can be respectively disposed on both opposing sides of the display area AA. When each of the reference voltage bus line VrefL, the anode reset voltage bus line VarL, and the initialization voltage bus line ViniL is disposed only on one of both opposing sides of the display area AA, one side is not limited to the left or right side.

Alternatively, each of the reference voltage bus line VrefL, the anode reset voltage bus line VarL, and the initialization voltage bus line ViniL is disposed on only one of an upper or lower side of the display area AA. However, embodiments of the present disclosure are not limited thereto. The reference voltage bus lines VrefL can be respectively disposed on upper and lower sides of the display area AA. The anode reset voltage bus lines VarL can be respectively disposed on upper and lower sides of the display area AA. The initialization voltage bus lines ViniL can be respectively disposed on upper and lower sides of the display area AA. However, embodiments of the present disclosure are not limited thereto.

The first scan drivers 322_O and 322_E, the second scan driver 324, and the first light-emission control signal driver 312 can be disposed in one side area around the display area AA. The third scan driver 326, the first scan drivers 322_O and 322_E, and the second light-emission control signal driver 314 can be disposed in the other side area around the display area AA. However, embodiments of the present disclosure are not limited thereto, and depending on an embodiment, at least one of the first scan drivers 322_O and 322_E, the second scan driver 324, and the first light-emission control signal driver 312 can be disposed in the other side area around the display area AA, while at least one of the third scan driver 326, the first scan drivers 322_O and 322_E, and the second light-emission control signal driver 314 can be disposed in one side area around the display area AA.

In one side area around the display area AA, the first scan drivers 322_O and 322_E can be disposed adjacent to the display area AA, and the second scan driver 324 can be disposed in the outermost area, and the first light-emission control signal driver 312 can be disposed between the first scan drivers 322_O and 322_E and the second scan driver 324.

Alternatively, depending on an embodiment of the present disclosure, the first light-emission control signal driver 312 can be disposed in the outermost area.

Furthermore, in the other side area around the display area AA, the first scan driver 322_O and 322_E can be disposed adjacent to the display area AA, and the third scan driver 326 can be disposed in the outermost area, and the second light-emission control signal driver 314 can be disposed between the first scan driver 322_O and 322_E and the third scan driver 326.

Alternatively, depending on an embodiment of the present disclosure, the second light-emission control signal driver 314 can be disposed in the outermost area.

Furthermore, the first scan drivers 322_O and 322_E can be divided into the odd-numbered scan drivers 322_O and the even-numbered scan drivers 322_E. The odd-numbered scan drivers 322_O can be respectively disposed on both opposing sides of the display area AA. The even-numbered scan drivers 322_E can be respectively disposed on both opposing sides of the display area AA. When the first scan driver is configured such that the odd-numbered scan drivers 322_0 and the even-numbered scan drivers 322_E operate separately, a sufficient time required for sampling the data voltage Vdata can be secured. Furthermore, the odd-numbered scan drivers 322_O are respectively disposed on both opposing sides of the display area AA, while the even-numbered scan drivers 322_E are respectively disposed on both opposing sides of the display area AA, thereby reducing a difference between sampling times of the data voltage Vdata in the pixels. Accordingly, as the first scan drivers 322_O and 322_E operate, the sufficient time for sampling the data voltage Vdata can be secured and the difference between the sampling times thereof in the pixels can be reduced, thereby improving the image quality of the display panel.

Figure 4:
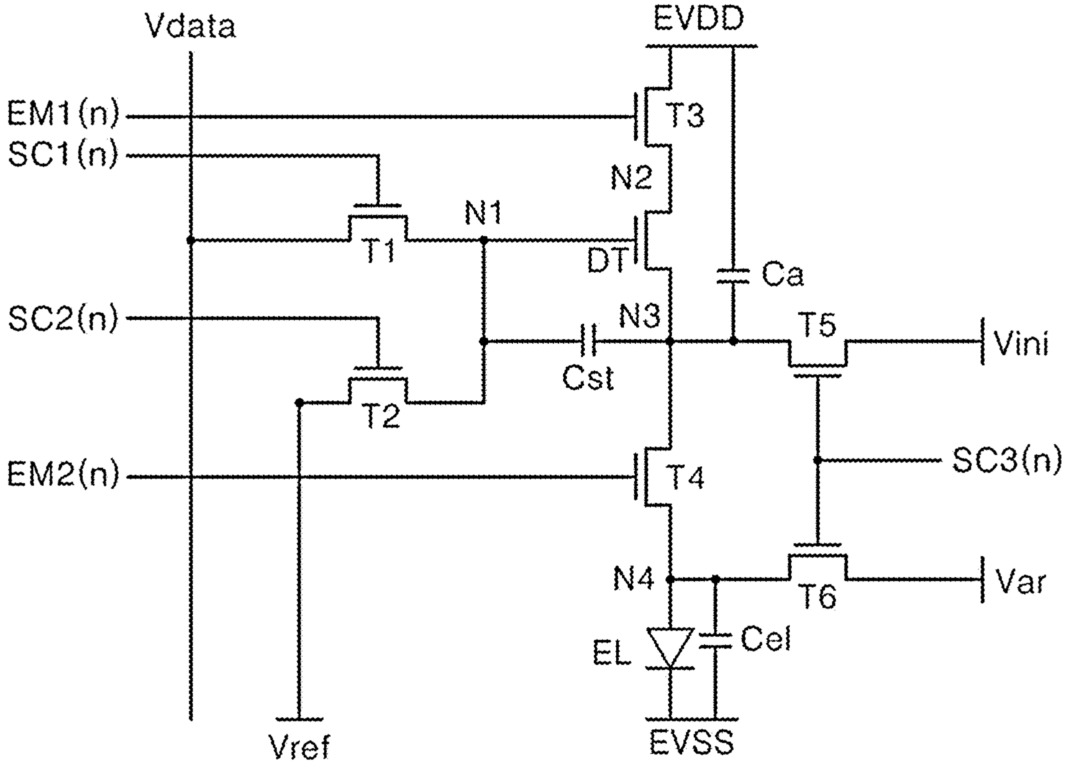
FIG. 4 is a diagram showing a pixel circuit of a display device according to an embodiment of the present disclosure.

FIG. 4 is a diagram of a pixel circuit in a display device according to an embodiment of the present disclosure. Particularly, FIG. 4 shows an example of an internal compensation pixel circuit for illustration. The display device according to an embodiment of the present disclosure can also be applied to other internal compensation circuits having structures of 4T1C, 7T1C, and 8T1C.

Referring to FIG. 4, each of a plurality of internal compensation pixels P can include a pixel circuit having the driving transistor DT and the light-emitting element EL connected to the pixel circuit.

The pixel circuit can control the driving current flowing through the light-emitting element EL to drive the light-emitting element EL. The pixel circuit can include the driving transistor DT, the first to sixth transistors T1 to T6, and the capacitor Cst. Each of the transistors DT, and T1 to T6 can include a first electrode, a second electrode, and a gate electrode. One of the first electrode and the second electrode can be a source electrode, and the other of the first electrode and the second electrode can be a drain electrode.

Each of the transistors DT, and T1 to T6 can be a P type thin-film transistor or an N type thin-film transistor. In an embodiment of FIG. 4, each of the transistors DT, and T1 to T6 is embodied as the N type thin-film transistor. However, embodiments of the present disclosure are not limited thereto. According to an embodiment, each of all or some of the transistors DT, and T1 to T6 can be a P type thin-film transistor or an N type thin-film transistor. Furthermore, the N type thin-film transistor can be embodied as an oxide thin-film transistor. The P type thin-film transistor can be embodied as a polycrystalline silicon thin-film transistor.

Hereinafter, an example in which each of the transistors DT, and T1 to T6 is embodied as the N type thin-film transistor is described. Accordingly, each of the transistors DT, and T1 to T6 can be turned on when a high voltage is applied thereto.

According to one example, the first transistor T1 constituting the pixel circuit can function as a data supply transistor, the second transistor T2 constituting the pixel circuit can function as an initialization transistor, and each of the third transistor T3 and the fourth transistor T4 constituting the pixel circuit can function as a light-emission control transistor. Furthermore, each of the fifth transistor T5 and the sixth transistor T6 constituting the pixel circuit can function as an initialization transistor.

The light-emitting element EL can include an anode electrode and a cathode electrode. The anode electrode of the light-emitting element EL can be connected to a fourth node N4, and the cathode electrode can be connected to the low-potential driving voltage EVSS. The fourth node N4 can be connected to a source electrode of the fourth transistor T4. The light-emitting element EL can include a capacitor Ce1 generated between the anode electrode and the cathode electrode. The capacitor Ce1 can be a parasitic capacitor generated between the anode electrode and the cathode electrode of the light-emitting element EL. The capacitor Ce1 can have the capacitance value of the light-emitting element EL.

The driving transistor DT can include a drain electrode connected to the source electrode of the third transistor T3, a gate electrode connected to the first node N1, and a source electrode connected to a third node N3. The driving transistor DT can provide the driving current to the light-emitting element EL based on a voltage of the first node N1 (or the data voltage Vdata stored in the capacitor Cst, which will be described later).

The first transistor T1 can include a first electrode connected to the data line DL or receiving the data voltage Vdata, a second electrode connected to a first node N1, and a gate electrode receiving the first scan signal SC1(*n*). The first transistor T1 can be turned on in response to the first scan signal SC1(*n*) and thus can transmit the data voltage Vdata to the first node N1. This first transistor T1 can be a data voltage supply transistor.

The capacitor Cst can be connected to and disposed between the first node N1 and the third node N3. The capacitor Cst can sample and store therein or maintain the provided data voltage Vdata thereto.

The second transistor T2 can include a first electrode connected to the reference voltage Vref, a second electrode connected to the first node N1, and a gate electrode receiving the second scan signal SC2(*n*). The second transistor T2 can be turned on in response to the second scan signal SC2(*n*) and thus can provide the reference voltage Vref to the node N1. This second transistor T2 can be an initialization transistor.

The third transistor T3 can be connected to and disposed between the high potential driving voltage EVDD and the driving transistor DT. The third transistor T3 can include a first electrode receiving the high-potential driving voltage EVDD, a second electrode connected to the driving transistor DT, and a gate electrode receiving the first light-emission control signal EM1(*n*). The third transistor T3 can be turned on in response to the first light-emission control signal EM1(*n*) and thus can provide the high potential driving voltage EVDD to the driving transistor DT. This third transistor T3 can be a light-emission control transistor.

The fourth transistor T4 can be connected to and disposed between the light-emitting element EL and the driving transistor DT. The fourth transistor T4 can include a first electrode connected to the light-emitting element EL, a second electrode connected to the driving transistor DT, and a gate electrode that receives the second light-emission control signal EM2(n). The fourth transistor T4 can be turned on in response to the second light-emission control signal EM2(n) and thus can provide the driving current controlled by the driving transistor DT to the light-emitting element EL. This fourth transistor T4 can be a light-emission control transistor.

The fifth transistor T5 can be connected to and disposed between the initialization voltage Vini and the third node N3. The fifth transistor T5 can include a first electrode connected to the initialization voltage Vini, a second electrode connected to the third node N3, and a gate electrode receiving the third scan signal SC3(n). The fifth transistor T5 can be turned on in response to the third scan signal SC3(n) and thus can provide the initialization voltage Vini to the third node N3. This fifth transistor T5 can be an initialization transistor.

The pixel circuit can have a capacitor Ca generated between the high potential driving voltage EVDD and the third node N3. The capacitor Ca can be a parasitic capacitor generated by the third transistor T3 and the driving transistor DT. The fifth transistor T5 can initialize the third node N3 and the capacitor Ca in response to the third scan signal SC3(n).

The sixth transistor T6 can be connected to and disposed between the anode reset voltage Var and the fourth node N4. The sixth transistor T6 can include a first electrode connected to the anode reset voltage Var, a second electrode connected to the fourth node N4, and a gate electrode receiving the third scan signal SC3(n). The sixth transistor T6 can be turned on in response to the third scan signal SC3(n) and thus can provide the anode reset voltage Var to the fourth node N4. This sixth transistor T6 can be an initialization transistor. The sixth transistor T6 can initialize the fourth node N4 and the capacitor Ce1 in response to the third scan signal SC3(n).

In this way, the internal compensation pixel P can include the light-emitting element EL that emits light in response to the driving current, the driving transistor DT that controls the driving current, the capacitor Cst connected to and disposed between the gate electrode and the source electrode of the driving transistor DT, the first transistor T1 for applying the data voltage Vdata to the gate electrode of the driving transistor DT based on the first scan signal SC1(n), the second transistor T2 for applying the reference voltage Vref to the gate electrode of the driving transistor DT based on the second scan signal SC2(n), the third transistor T3 for applying the high-potential driving voltage EVDD to the drain electrode of the driving transistor DT based on the first light-emission control signal EM1(n), the fourth transistor T4 for applying the driving current from the driving transistor DT to the light-emitting element based on the second light-emission control signal EM2(n), the fifth transistor T5 for applying the initializing voltage Vini to the source electrode of the driving transistor DT based on the third scan signal SC3(n), and the sixth transistor T6 which applies the anode reset voltage Var to the anode electrode of the light-emitting element EL based on the third scan signal SC3(n).

Figure 5:
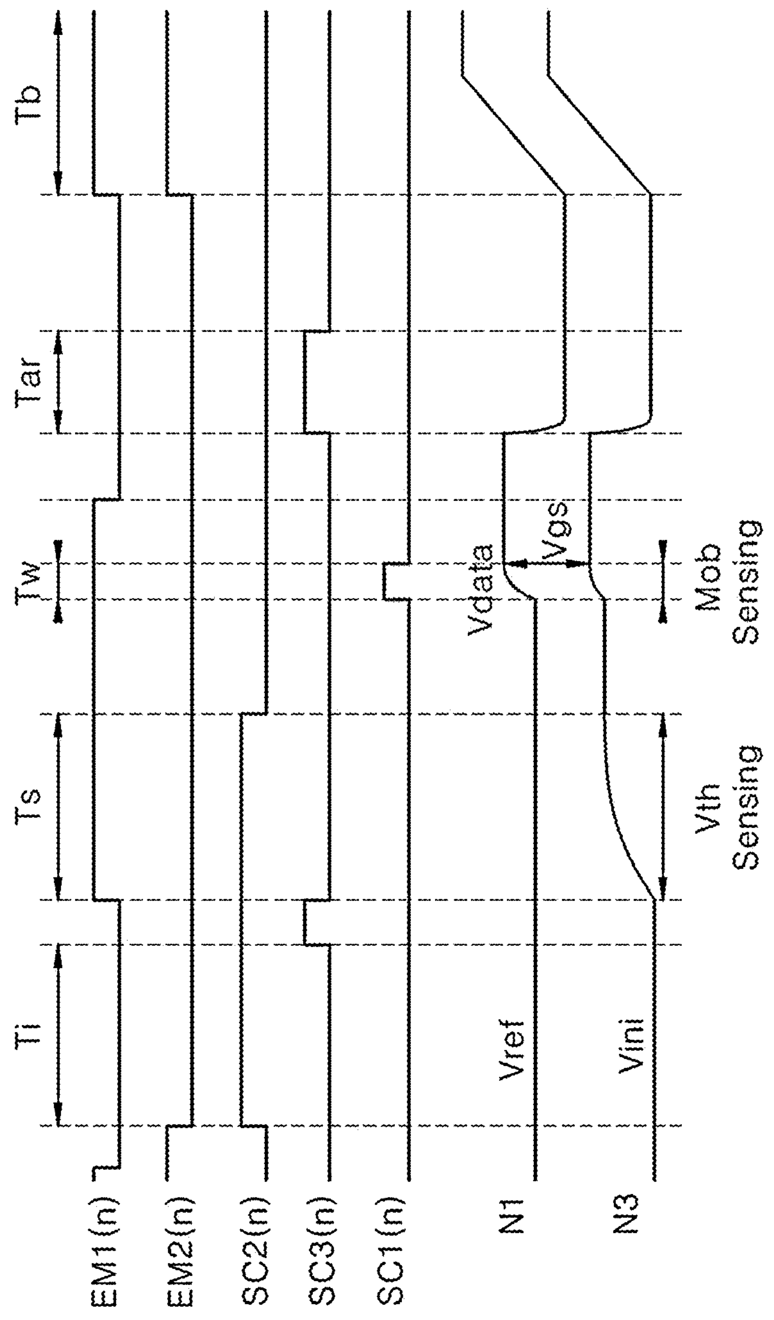
FIG. 5 is a timing diagram showing an operation of a pixel circuit of a display device according to an embodiment of the present disclosure.

FIG. 5 is a timing diagram showing an operation of a pixel circuit of the display device according to an embodiment of the present disclosure.

Referring to FIG. 5, the operation periods of the pixel circuit of the display device can include an initialization period Ti, a sensing period Ts, a write period Tw, an anode reset period Tar, and a light-emission period Tb. However, this is only an example, and the pixel circuit of the display device can not be limited to this order.

In the initialization period Ti, each of the first light-emission control signal EM1(n), the second light-emission control signal EM2(n), the third scan signal SC3(n), the first scan signal SC1(n) is at a low state, and the second scan signal SC2(n) is at a high state. Accordingly, the first transistor T1 and the third to sixth transistors T3, T4, T5, and T6 of the pixel circuit are in a tuned-off state, and the second transistor T2 is brought into a turned-on state.

In the initialization period Ti, the second transistor T2 provides the reference voltage Vref to the first node N1 in response to the second scan signal SC2(n).

In the initialization period Ti, the second transistor T2 initializes the gate electrode of the driving transistor DT, the first node N1, and the capacitor Cst by providing the reference voltage Vref to the first node N1.

In the sensing period Ts, each of the second light-emission control signal EM2(n), the third scan signal SC3(n), and the first scan signal SC1 (n) is at a low state, and each of the second scan signal SC2(n) and the first light-emission control signal EM1(n) is at a high state.

Accordingly, the first transistor T1, the fourth to sixth transistors T4, T5, and T6 of the pixel circuit are brought into a turned-off state, while the second transistor T2, the third transistor T3, and the driving transistor DT are brought into a turned-on state.

In the sensing period Ts, the third transistor T3 provides the high-potential driving voltage EVDD to the drain electrode of the driving transistor DT in response to the first light-emission control signal EM1(n), so that the driving transistor DT is turned on, and the voltage of the third node N3 increases by the threshold voltage of the driving transistor DT, and the capacitor Cst samples the threshold voltage of the driving transistor DT.

In the write period Tw, each of the second light-emission control signal EM2(n), the second scan signal SC2(n), and the third scan signal SC3(n) is at a low state, while each of the first scan signal SC1(n) and the first light-emission control signal EM1(n) is at a high state. Accordingly, the second transistor T2 and the fourth to sixth transistors T4, T5, and T6 of the pixel circuit are brought into a turned-off state, and the first transistor T1 and the third transistor T3 are brought into a turned-on state.

In the write period Tw, the first transistor T1 provides the data voltage Vdata to the gate electrode of the driving transistor DT in response to the first scan signal SC1 (n), so that the voltage level of the first node N1 rises by the data voltage Vdata, and the capacitor Cst samples the data voltage Vdata. At this time, the threshold voltage Vth of the driving transistor DT is canceled by the previously sampled threshold voltage Vth, so that only the data voltage Vdata can be sampled to the capacitor Cst. Furthermore, in the write period Tw, a mobility Mob of the driving transistor can be sensed based on the gate-source voltage $V_{gs}$ between the gate electrode and the source electrode of the driving transistor.

In the anode reset period Tar, the first light-emission control signal EM1(n), the second light-emission control signal EM2(n), the first scan signal SC1(n), and the second scan signal SC2(n) are at a low state, and the third scan signal SC3(n) is at a high state. Accordingly, the first transistor T1, second transistor T2, third transistor T3, and fourth transistor T4 of the pixel circuit are brought into a turned-off state, while the fifth transistor T5 and sixth the transistor T6 are brought into a turned-on state.

In the anode reset period Tar, the fifth transistor T5 provides the initialization voltage Vini to the third node N3 in response to the third scan signal SC3(*n*). The fifth transistor T5 initializes the source electrode of the driving transistor DT, the third node N3, and the capacitor Ca by providing the initialization voltage Vini to the third node N3.

In the anode reset period Tar, the sixth transistor T6 provides the anode reset voltage Var to the fourth node N4 in response to the third scan signal SC3(*n*). The sixth transistor T6 initializes the anode electrode of the light-emitting element, the fourth node N4, and the capacitor Ce1 by providing the anode reset voltage Var to the fourth node N4.

In the light-emission period Tb, each of the first light-emission control signal EM1(*n*), and the second light-emission control signal EM2(*n*) is at a high state, while each of the first scan signal SC1(*n*), the second scan signal SC2(*n*), and the third scan signal SC3(*n*) is at a low state. Accordingly, the third transistor T3, the driving transistor DT, and the fourth transistor T4 of the pixel circuit are brought into a turned-on state, while the first transistor T1, the second transistor T2, the fifth transistor T5, and the sixth transistor T6 are brought into a turned-off state.

In the light-emission period Tb, the third transistor T3, the driving transistor DT, and the fourth transistor T4 are brought into a turned-on state, so that a current path is established between the high-potential driving voltage EVDD and the low-potential driving voltage EVSS, and thus the driving current is supplied to the light-emitting element EL. An intensity of the driving current is determined based on a value of the data voltage Vdata sampled to the capacitor Cst. Since the light-emitting element EL operates based on the value of the data voltage Vdata regardless of the value of the threshold voltage Vth of the driving transistor DT, the threshold voltage Vth of the driving transistor DT can be compensated for.

The internal compensation pixel is configured such that the driving transistor DT operates during the light-emission period Tb for which the light-emitting element emit lights, and the driving transistor DT also operates during the sensing period Ts for which the threshold voltage of the driving transistor is sensed. Therefore, the degradation compensation modeling to compensate for the degradation of the internal compensation pixel can include the first degradation compensation modeling about the operation characteristics of the internal compensation pixel for the light-emission period for which light from the light-emitting element is emitted, and the second degradation compensation modeling about the operation characteristics of the internal compensation pixel for the sensing period Ts for which the threshold voltage of the driving transistor of the pixel is sensed.

According to embodiments of the present disclosure, in order to compensate for degradation of the internal compensation display device, the operation characteristics in the period for emitting light-emitting elements and the operation characteristics in the period for sensing the threshold voltage of the driving transistor of the pixel inside the pixel can be applied to the degradation compensation modeling.

Depending on the operation characteristics of the internal compensation pixel, a high level of peak current can be applied to the driving transistor DT for the sensing period Ts for which the threshold voltage of the driving transistor DT is sensed. This can cause degradation of the driving transistor DT.

In accordance with the present disclosure, to order to enable accurate degradation compensation of the internal compensation display panel, the operation characteristics during the light-emission period for which the light-emitting element emits the light can be applied to the first compensation modeling, and the operation characteristics during the sensing period for which the threshold voltage of the driving transistor is sensed can be applied to the second compensation modeling.

The first compensation modeling can be used to calculate the compensation data to compensate for the degradation characteristics during the light-emission period. The first compensation data corresponding to the degradation characteristics of the light-emission period Tb can be calculated based on the following Equation 2 as follows.

$$\Delta V_{th\_d} = (t/\tau\_d)^{\beta\_d},$$
$$\tau\_d = A\_d \cdot V_{gs}^{-n} \cdot \exp\left(\frac{E_{a\_d}}{R}\frac{1}{T}\right), \quad \text{Equation 2}$$

where t denotes the operation time of the display panel, τ_d denotes a characteristic temporal scale of degradation during the light-emission period, β_d denotes a stretch index during the light-emission period, A_d denotes a process and element distribution coefficient during the light-emission period, $V_{gs}$ denotes a gate-source voltage of the driving transistor based on the data voltage, n denotes the acceleration coefficient, Ea_d denotes activation energy during the light-emission period, R denotes the ideal gas constant, and T denotes the absolute temperature.

The second compensation modeling can be used to calculate compensation data to compensate for the degradation characteristics during the sensing period Ts. The second second compensation data corresponding to the degradation characteristics of the sensing period Ts can be calculated based on the following Equation 3 as follows:

$$\Delta V_{th\_s} = (t/\tau\_s)^{\beta\_s},$$
$$\tau\_s = A\_s \cdot \exp\left(\frac{E_{a\_s}}{R}\frac{1}{T}\right), \quad \text{Equation 3}$$

where t denotes the operation time of the display panel, τ_s denotes a characteristic temporal scale of degradation during the sensing period, β_s denotes a stretch index during the sensing period, A_s denotes a process and element distribution coefficient during the sensing period, Ea_s denotes activation energy during the sensing period, R denotes the ideal gas constant, and T denotes an absolute temperature.

In this regard, since the sensing operation of the internal compensation circuit during the sensing period is performed under a global condition, the second compensation modeling unlike the first compensation modeling during the light-emission period can be created only based on the temperature T and the factor A_s related to the initial threshold voltage of the driving transistor without the $V_{gs}$ acceleration factor.

Further, the different β, A, and Ea factors can be based on different degradation characteristics of the light-emission period and the sensing period and thus can be separately applied to the first and second compensation modeling. That is, the β, A, and Ea factors during the light-emission period can be set to have different values from the β, A, and Ea factors during the sensing period.

According to embodiments of the present disclosure, the display device can generate the compensation data based on the Equation 2 of the first compensation modeling representing the operation characteristics during the light-emission period Tb of the internal compensation pixel and the Equation 3 of the second compensation modeling representing the operation characteristics during the sensing period Ts, and then can compensate for the image data using the compensation data. The present disclosure illustrates an example in which the controller 200 performs the compensation. However, embodiments of the present disclosure are not limited thereto. According to another embodiment, the data driver 200 or a separate degradation compensation device can calculate the compensation data based on the first compensation modeling and the second compensation modeling, and apply the compensation data to the image data.

Figure 6:
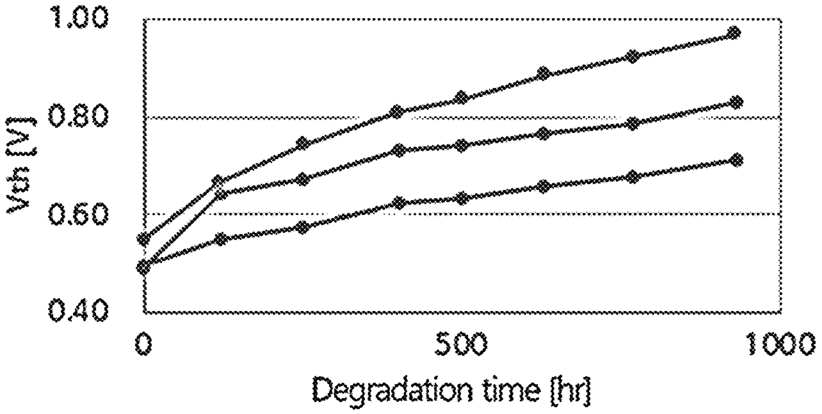
FIG. 6 is a diagram showing operation characteristics of an internal compensation pixel in a light-emission period of the pixel circuit as shown in FIG. 4.

FIG. 6 is a diagram showing the operation characteristics of the internal compensation pixel during the light-emission period of the pixel circuit shown in FIG. 4.

Referring to FIG. 6, the operation characteristics of the internal compensation pixel during the light-emission period Tb indicate that the threshold voltage of the driving transistor in each of the R, G, and B pixel changes as the operation time (or degradation time) elapses.

In an embodiment of the present disclosure, the changes in the threshold voltage of the driving transistor in the R, G, and B pixels during the light-emission period are different from each other. Thus, the different degradation characteristics can be respectively applied to the degradation compensation modeling in the R, G, and B pixels.

In one example, in order that the different degradation characteristics during the light-emission period are respectively applied to the degradation compensation modeling in the R, G, and B pixels, at least one factor among the β_d, A_d, and Ea_d factors of the first compensation modeling can be set (or calculated) to have different values in the R, G, and B pixels. That is, at least one of the β_d, A_d, and Ea_d factors in the above Equation 2 of the first compensation modeling can be set (or calculated) to have different values in the R, G, and B pixels.

Figure 7:
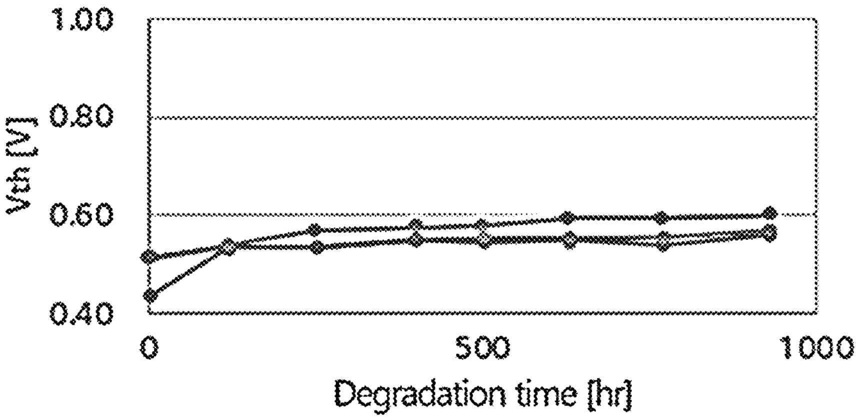
FIG. 7 is a diagram showing operation characteristics of an internal compensation pixel in a sensing period of the pixel circuit as shown in FIG. 4.

FIG. 7 is a diagram showing the operation characteristics of the internal compensation pixel during the sensing period of the pixel circuit shown in FIG. 4.

Referring to FIG. 7, the operation characteristics of the internal compensation pixel during the sensing period Ts indicate that the threshold voltage of the driving transistor in each of the R, G, and B pixel changes as the operation time (or degradation time) elapses.

In an embodiment of the present disclosure, the changes in the threshold voltage of the driving transistor in the R, G, and B pixels during the sensing period Ts are different from each other. Thus, the different degradation characteristics can be respectively applied to the degradation compensation modeling in the R, G, and B pixels.

In one example, in order that the different degradation characteristics during the sensing period Ts are respectively applied to the degradation compensation modeling in the R, G, and B pixels, at least one factor among the β_s, A_s, and Ea_s factors of the second compensation modeling can be set (or calculated) to have different values in the R, G, and B pixels. That is, at least one of the β_s, A_s, and Ea_s factors in the above Equation 3 of the second compensation modeling can be set (or calculated) to have different values in the R, G, and B pixels.

A display device according to various aspects and features of the present disclosure can be described as follows.

A first aspect of the present disclosure provides a display device comprising: a display panel including a plurality of internal compensation pixels; and a data driver configured to apply a data voltage to the display panel; and a controller configured to: compensate for image data based on a degradation compensation modeling, wherein the degradation compensation modeling includes a degradation compensation modeling representing operation characteristics of the internal compensation pixel during a light-emission period, and a degradation compensation modeling representing operation characteristics of the internal compensation pixel during a sensing period; and provide the compensated image data to the data driver.

According to some features of the display device of the first aspect, the degradation compensation modeling includes: a first compensation modeling representing degradation characteristics of a driving transistor of the internal compensation pixel during the light-emission period; and a second compensation modeling indicating degradation characteristics of the driving transistor of the internal compensation pixel during the sensing period.

According to some features of the display device of the first aspect, the sensing period is set as a period during which the internal compensation pixel senses a threshold voltage of the driving transistor, wherein the light-emission period is set as a period during which a light-emitting element of the internal compensation pixel emits light under the data voltage.

According to some features of the display device of the first aspect, the first compensation modeling is defined based on a following Equation 1:

$$\Delta V_{th\_d} = (t/\tau\_d)^{\beta\_d}, \qquad \text{Equation 1}$$

$$\tau\_d = A\_d \cdot V_{gs}^{-n} \cdot \exp\left(\frac{E_{a\_d}}{R}\frac{1}{T}\right),$$

where t denotes an operation time of the display panel, τ_d denotes a characteristic temporal scale of degradation during the light-emission period, β_d denotes a stretch index during the light-emission period, A_d denotes a process and element distribution coefficient during the light-emission period, $V_{gs}$ denotes a gate-source voltage of the driving transistor based on the data voltage, n denotes an acceleration coefficient, Ea_d denotes activation energy during the light-emission period, R denotes the ideal gas constant, and T denotes the absolute temperature.

According to some features of the display device of the first aspect, at least one factor among the β_d, A_d, and Ea_d factors of the first compensation modeling is set to have different values in R, G, and B pixels, such that different degradation characteristics during the light-emission period are respectively applied to the first degradation compensation modeling in the R, G, and B pixels.

According to some features of the display device of the first aspect, the second compensation modeling is defined based on a following Equation 2:

$$\Delta V_{th\_s} = (t/\tau\_s)^{\beta\_s}, \qquad \text{Equation 2}$$

$$\tau\_s = A\_s \cdot \exp\left(\frac{E_{a\_s}}{R}\frac{1}{T}\right),$$

where t denotes an operation time of the display panel, τ_s denotes a characteristic temporal scale of degradation during the sensing period, β_s denotes a stretch index during the sensing period, A_s denotes a process and element distribution coefficient during the sensing period, Ea_s denotes activation energy during the sensing period, R denotes an ideal gas constant, and T denotes the absolute temperature.

According to some features of the display device of the first aspect, at least one factor among the β_s, A_s, and Ea_s factors of the second compensation modeling is set to have different values in R, G, and B pixels, such that different degradation characteristics during the sensing period are respectively applied to the second degradation compensation modeling in the R, G, and B pixels.

According to some features of the display device of the first aspect, the controller is configured to compensate for the image data based on a sum of a value calculated by the first compensation modeling and a value calculated by the second compensation modeling.

According to some features of the display device of the first aspect, the internal compensation pixel includes: a light-emitting element for emitting light under a driving current; a driving transistor configured to control the driving current; a capacitor connected to and disposed between a gate electrode and a source electrode of the driving transistor; a first transistor configured to apply the data voltage to the gate electrode of the driving transistor in response to reception of a first scan signal; a second transistor configured to apply a reference voltage to the gate electrode of the driving transistor in response to reception of a second scan signal; a third transistor configured to apply a high-potential driving voltage to a drain electrode of the driving transistor in response to reception of a first light-emission control signal; a fourth transistor configured to apply the driving current from the driving transistor to the light-emitting element in response to reception of a second light-emission control signal; a fifth transistor configured to apply an initialization voltage to the source electrode of the driving transistor in response to reception of a third scan signal; and a sixth transistor configured to apply an anode reset voltage to an anode electrode of the light-emitting element in response to reception of the third scan signal.

According to some features of the display device of the first aspect, the internal compensation pixel is configured to control the light-emitting element to emit light under the data voltage during the light-emission period, wherein the degradation characteristics of the driving transistor during the light-emission period are applied to the first compensation modeling of the degradation compensation modeling.

According to some features of the display device of the first aspect, the internal compensation pixel is configured to sense the threshold voltage of the driving transistor during the sensing period, wherein the degradation characteristics of the driving transistor during the sensing period are applied to the second compensation modeling of the degradation compensation modeling.

A second aspect of the present disclosure provides a display device comprising: a display panel including a plurality of internal compensation pixels, wherein each of the internal compensation pixels is configured to sense a threshold voltage of a driving transistor during a sensing period, and to emit light under a data voltage during a light-emission period, wherein the display device is configured to: apply operation characteristics of the internal compensation pixel during the light-emission period to a first compensation modeling; apply operation characteristics of the internal compensation pixel during the sensing period to a second compensation modeling; and compensate for image data based on the first compensation modeling and the second compensation modeling.

According to some features of the display device of the second aspect, the first compensation modeling is defined based on a following Equation 1:

$$\Delta V_{th\_d} = (t/\tau\_d)^{\beta\_d},\quad \tau\_d = A\_d \cdot V_{gs}^{-n} \cdot \exp\left(\frac{E_{a\_d}}{R}\frac{1}{T}\right), \qquad \text{Equation 1}$$

where t denotes an operation time of the display panel, τ_d denotes a characteristic temporal scale of degradation during the light-emission period, β_d denotes a stretch index during the light-emission period, A_d denotes a process and element distribution coefficient during the light-emission period, $V_{gs}$ denotes a gate-source voltage of the driving transistor based on the data voltage, n denotes an acceleration coefficient, Ea_d denotes activation energy during the light-emission period, R denotes the ideal gas constant, and T denotes the absolute temperature.

According to some features of the display device of the second aspect, at least one factor among the β_d, A_d, and Ea_d factors of the first compensation modeling is set to have different values in R, G, and B pixels, such that different degradation characteristics during the light-emission period are respectively applied to the first degradation compensation modeling in the R, G, and B pixels.

According to some features of the display device of the second aspect, the second compensation modeling is defined based on a following Equation 2:

$$\Delta V_{th\_s} = (t/\tau\_s)^{\beta\_s},\quad \tau\_s = A\_s \cdot \exp\left(\frac{E_{a\_s}}{R}\frac{1}{T}\right), \qquad \text{Equation 2}$$

where t denotes an operation time of the display panel, τ_s denotes a characteristic temporal scale of degradation during the sensing period, β_s denotes a stretch index during the sensing period, A_s denotes a process and element distribution coefficient during the sensing period, Ea_s denotes activation energy during the sensing period, R denotes an ideal gas constant, and T denotes the absolute temperature.

According to some features of the display device of the second aspect, at least one factor among the β_s, A_s, and Ea_s factors of the second compensation modeling is set to have different values in R, G, and B pixels, such that different degradation characteristics during the sensing period are respectively applied to the second degradation compensation modeling in the R, G, and B pixels.

Although embodiments of the present disclosure have been described with reference to the accompanying drawings, the present disclosure is not limited to the above embodiments, but can be implemented in various different forms. A person skilled in the art can appreciate that the present disclosure can be practiced in other concrete forms without changing the technical spirit or essential characteristics of the present disclosure. Therefore, it should be appreciated that the embodiments as described above is not restrictive but illustrative in all respects.

What is claimed is:

1. A display device comprising:

a display panel including an internal compensation pixel having a driving transistor and a light-emitting element;

a controller configured to output compensation image data based on a degradation compensation modeling; and a data driver configured to apply a data voltage corresponding to the compensation image data to the internal compensation pixel, wherein the degradation compensation modeling includes:

a first compensation modeling for calculating a first compensation data for compensating for degradation characteristics of the driving transistor during a light-emission period of the light-emitting element; and a second compensation modeling for calculating a second compensation data for compensating for degradation characteristics of the driving transistor during a threshold voltage sampling period of the driving transistor, wherein the compensation image data is obtained based on a sum of the first compensation data and the second compensation data.

2. The display device of claim 1, wherein the first compensation modeling is defined based on a following Equation 1:

$$\Delta V_{th\_d} = (t/\tau\_d)^{\beta\_d},\qquad \text{Equation 1}$$

$$\tau\_d = A\_d \cdot V_{gs}^{-n} \cdot \exp\left(\frac{E_{a\_d}}{R}\frac{1}{T}\right),$$

where t denotes an operation time of the display panel, τ_d denotes a characteristic temporal scale of degradation during the light-emission period, β_d denotes a stretch index during the light-emission period, A_d denotes a process and element distribution coefficient during the light-emission period, $V_{gs}$ denotes a gate-source voltage of the driving transistor based on the data voltage, n denotes an acceleration coefficient, Ea_d denotes activation energy during the light-emission period, R denotes an ideal gas constant, and T denotes an absolute temperature.

3. The display device of claim 2, wherein at least one factor among the β_d, A_d, and Ea_d factors of the first compensation modeling is set to have different values in red (R), green (G), and blue (B) pixels, so that different degradation characteristics during the light-emission period are respectively applied to the first compensation modeling in the R, G, and B pixels.

4. The display device of claim 2, wherein the second compensation modeling is defined based on a following Equation 2:

$$\Delta V_{th\_s} = (t/\tau\_s)^{\beta\_s},\qquad \text{Equation 2}$$

$$\tau\_s = A\_s \cdot \exp\left(\frac{E_{a\_s}}{R}\frac{1}{T}\right),$$

where t denotes an operation time of the display panel, τ_s denotes a characteristic temporal scale of degradation during the threshold voltage sampling period, β_s denotes a stretch index during the threshold voltage sampling period, A_s denotes a process and element distribution coefficient during the threshold voltage sampling period, Ea_s denotes activation energy during the threshold voltage sampling period, R denotes an ideal gas constant, and T denotes an absolute temperature.

5. The display device of claim 4, wherein at least one factor among the β_s, A_s, and Ea_s factors of the second compensation modeling is set to have different values in red (R), green (G), and blue (B) pixels, so that different degradation characteristics during the threshold voltage sampling period are respectively applied to the second compensation modeling in the R, G, and B pixels.

6. The display device of claim 1, wherein the internal compensation pixel includes:

the light-emitting element configured to emit light under a driving current;

the driving transistor configured to control the driving current;

a capacitor disposed between a gate electrode and a source electrode of the driving transistor;

a first transistor configured to apply the data voltage to the gate electrode of the driving transistor in response to reception of a first scan signal;

a second transistor configured to apply a reference voltage to the gate electrode of the driving transistor in response to reception of a second scan signal;

a third transistor configured to apply a high-potential driving voltage to a drain electrode of the driving transistor in response to reception of a first light-emission control signal;

a fourth transistor configured to apply the driving current from the driving transistor to the light-emitting element in response to reception of a second light-emission control signal;

a fifth transistor configured to apply an initialization voltage to the source electrode of the driving transistor in response to reception of a third scan signal; and a sixth transistor configured to apply an anode reset voltage to an anode electrode of the light-emitting element in response to reception of the third scan signal.

7. The display device of claim 6, wherein the internal compensation pixel is configured to control the light-emitting element to emit light under the data voltage during the light-emission period, and wherein the degradation characteristics of the driving transistor during the light-emission period are applied to the first compensation modeling of the degradation compensation modeling.

8. The display device of claim 7, wherein the internal compensation pixel is configured to sense the threshold voltage of the driving transistor and store the threshold voltage in the capacitor during the threshold voltage sampling period, and wherein the degradation characteristics of the driving transistor during the threshold voltage sampling period are applied to the second compensation modeling of the degradation compensation modeling.

* * * * *